US00RE37341B1

(19) United States
(12) Reissued Patent
Cornils et al.

(10) Patent Number: US RE37,341 E
(45) Date of Reissued Patent: Aug. 28, 2001

(54) DEVICE FOR EXTRUDING A POLYMER FRAME ONTO A PLATE-SHAPED OBJECT

(75) Inventors: Gerd Cornils, Merzenich; Herbert Joeris, Wurselen; Rolf Kotte, Alsdorf; Heinz Scholl, Eschweiler, all of (DE)

(73) Assignee: Saint Gobain Vitrage, Courbevoie (FR)

( * ) Notice: This patent is subject to a terminal disclaimer.

(21) Appl. No.: 09/425,047

(22) Filed: Oct. 22, 1999

Related U.S. Patent Documents

Reissue of:
(64) Patent No.: 5,645,785
Issued: Jul. 8, 1997
Appl. No.: 08/540,858
Filed: Oct. 10, 1995

U.S. Applications:

(63) Continuation-in-part of application No. 08/286,725, filed on Aug. 5, 1995, now Pat. No. 5,507,994.

(30) Foreign Application Priority Data

Aug. 9, 1993 (DE) ..... 43 26 650
Oct. 17, 1994 (FR) ..... 94-12337

(51) Int. Cl.[7] ..... B29C 47/02
(52) U.S. Cl. ..... 264/252; 156/108; 156/500; 264/177.16; 425/113; 425/466; 425/192 R
(58) Field of Search ..... 264/252, 259, 264/261, 171.13, 172.1, 177.1, 177.16; 425/192 R, 466, 467, 114, 113, 115; 156/108, 500

(56) References Cited

U.S. PATENT DOCUMENTS

| | | | |
|---|---|---|---|
| 3,088,166 | 5/1963 | Colombo | 18/13 |
| 3,408,799 | 11/1968 | Jennings | 56/28 |
| 3,491,176 | 1/1970 | Wahlstrom | 264/138 |
| 4,571,278 | 2/1986 | Kunert | 156/108 |
| 4,584,155 | 4/1986 | Zanella | 264/252 |
| 4,973,436 | 11/1990 | Lisec | 264/40.1 |
| 5,057,265 | 10/1991 | Kunert et al. | 264/511 |
| 5,061,429 | 10/1991 | Yoshihara et al. | 264/252 |
| 5,069,852 | 12/1991 | Leone et al. | 264/171 |
| 5,108,526 | 4/1992 | Cornils et al. | 156/108 |
| 5,131,349 | 7/1992 | Keller et al. | 118/73 |
| 5,183,612 | 2/1993 | Suita et al. | 264/145 |
| 5,256,361 | 10/1993 | Keys | 264/236 |
| 5,273,704 | 12/1993 | Scholl et al. | 264/252 |
| 5,336,349 | 8/1994 | Cornils et al. | 156/107 |
| 5,358,397 | 10/1994 | Ligon et al. | 425/145 |
| 5,362,428 | 11/1994 | Tsujino et al. | 264/40.5 |
| 5,382,395 | 1/1995 | Hoenke | 264/40.7 |
| 5,411,696 | 5/1995 | Ito et al. | 264/252 |
| 5,456,874 | 10/1995 | Cordes et al. | 264/138 |
| 5,507,994 | 4/1996 | Cornils et al. | 264/252 |

FOREIGN PATENT DOCUMENTS

| | | |
|---|---|---|
| 28284 | 5/1981 | (EP) . |
| 0493068 A1 | 7/1992 | (EP) . |
| 1405845 | 9/1975 | (GB) . |
| 2099688 | 12/1982 | (GB) . |
| 3-14770 | 1/1991 | (JP) . |
| 4151225 | 5/1992 | (JP) . |
| 4226321 | 8/1992 | (JP) . |
| WO 95/04493 | 2/1995 | (WO) . |

*Primary Examiner*—Jan H. Silbaugh
*Assistant Examiner*—Mark Eashoo
(74) *Attorney, Agent, or Firm*—Pennie & Edmonds LLP

(57) ABSTRACT

This invention concerns a device used in the process of manufacturing an automobile pane 1 equipped with a polymer frame 52 placed on the edge of the pane 1. The frame 52 is extruded onto the pane 1 which can be moved by means of a suitable support in such a way that the edge of the pane travels through a recess in an extrusion head 25 and 40. The recess of the extrusion head 40 preferably includes a U-shaped jaw 41 straddling the edge of the pane. At the front extremity of the two half-jaws of the U-shaped jaw 41 there are disposed sealing ledges or shoes 42 and 43 which are movable perpendicularly to the surfaces of the pane and which, during extrusion, bear upon the surfaces of the pane. Alternatively, the extrusion head can include a fixed jaw where the sealing ledges or shoes slideably and sealingly contact the plate.

34 Claims, 6 Drawing Sheets

DEVICE FOR EXTRUDING A POLYMER FRAME ONTO A PLATE-SHAPED OBJECT

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of application Ser. No. 08/286,725 filed Aug. 5, 1995 now U.S. Pat No. 5,507,994.

TECHNICAL FIELD

This invention concerns a device for extruding a profiled cord of polymer onto the periphery of an essentially state-shaped object, in particular onto the periphery of a pane. The device comprises an extrusion head in relative displacement along the edge of the plate, where it deposits a profiled cord composed of a polymer at the outlet from a calibrated nozzle. The invention concerns, more specifically, the case in which the plate is moved while the extrusion head has only reduced mobility and is generally retained in a fixed position.

BACKGROUND OF THE INVENTION

It is known in the art to utilize various devices for depositing a profiled frame onto the periphery of a pane, such as an automobile glazing. These devices comprise supporting and displacing elements for the pane onto which the profiled frame is to be deposited with the relative movement between pane and extrusion head along the edge of the pane being produced to place the frame on the peripheral edge of the pane. The relative movement along the edge is produced by displacement of one of the extrusion head or the pane, for example, by a robot. In either case, the head is supplied with fluid polymer from a reservoir. When the head moves relative to the pane, the supply of polymer accompanies its movement or is connected to the head by a flexible pipe connected to a fixed distributor. Movement of the edge of the pane relative to a fixed extrusion head is described in European Patent Applications EP-0 585 129 and EP-0 493 068. Many documents describe the technique of extrusion of a polymer frame onto the periphery of a plate, such as European Patent Applications EP-A-121 481 and EP-A-524 092.

The thickness tolerances of the panes are not negligible and it is therefore necessary for the extrusion heads of the above type to accept the thickest panes of a given type (i.e., an upper limit of the tolerance on the thickness). However, for all the panes of a smaller thickness, the fluid polymer can escape during extrusion through the slot or slots left free between the wall faces of the extrusion head and the surfaces of the pane. A deposit is thus left on the pane after extrusion, which must be removed in a supplementary phase of the production process.

Since the tolerance of automobile panes is not precisely controlled by the pane manufacturer, it is difficult to precisely place a polymer frame on the edge of the pane. To avoid this problem. U.S. Pat No. 5,183,612 discloses the deposition of the polymer frame onto a dummy windshield which has controlled dimensions. After the frame has cured, it is removed from the dummy windshield and then placed on the glass pane. Also, the polymer frame must be bonded to the glass pane when placed thereon. This process is cumbersome and results in duplicative operation as well as handling and storage problems for the cured polymer frame.

Another difficulty of prior art devices is that a secure seal to the pane is not always achieved. This can result in the escape of polymer from between the seal and the glass surface. Furthermore, movement between the die head and the pane becomes difficult if the seal between the die head and the pane is too strong. The present invention resolves these problems in a simple yet efficient manner.

SUMMARY OF THE INVENTION

The present invention relates to an apparatus for producing a shaped polymer frame on a plate having top and bottom main surfaces and a peripheral edge. The apparatus further comprises an extrusion die having a body which defines a plate-receiving recess for receiving the edge of the plate and portions of the main surfaces adjacent thereto; a first sealing ledge which is movable between (1) a retracted position which allows entry of the plate edge into the recess, and (2) an engaged position in contact with one of the main surfaces of the plate, wherein an open area is defined between the die body, sealing ledge and the plate in the shape of the polymer frame; and means for moving the plate relative to the extrusion die, where the moving means advances the edge of the plate through the recess to receive the shaped polymer frame on the edge and one of the main surfaces of the plate.

This embodiment also may include moving the first sealing ledge between the retracted and engaged positions in a direction which is essentially perpendicular to the main surfaces of the plate. The moving means preferably comprises spring means for biasing the first sealing ledge toward the engaged position and rod means for returning the first sealing ledge to the retracted position. The recess can include a first surface which is spaced from the plate and a second surface which contacts the plate on the surface opposite that which is contacted by the first sealing ledge in the engaged position, so that the polymer frame is provided on the edge and a portion of one main surface of the plate. Alternatively, the device can also include a second sealing ledge which is movable between (1) a retracted position which allows entry of the plate edge into the recess, and (2) an engaged position in contact with the other main surface of the plate, and the recess can include first and second surfaces which are spaced from the plate, so that the polymer frame is provided on the edge and a portion of each main surface of the plate.

Advantageously, the portions of the first sealing ledge and recess which contact the plate include a layer of an elastic material thereon to facilitate sliding movement upon the plate. Also, one or both of the sealing ledges can include an arcuate surface which assists in the formation of an arcuate portion for the polymer frame. The apparatus may also include a support wheel which travels along the surface of the plate and compensates for shape tolerances of the plate.

Another embodiment of the invention relates to an apparatus for producing a shaped polymer frame on a plate having top and bottom main surfaces and a peripheral edge. The apparatus further comprises an extrusion die having a one-piece body that defines a plate receiving recess for receiving the edge of the plate and portions of the main surfaces adjacent thereto. The plate receiving recess comprises first and second sealing ledges which slidingly engage the main surfaces of the plate. An open area is defined between the die body, sealing ledges and the plate in the shape of the polymer frame, and the sealing ledges provide a seal for the recess and facilitate sliding movement between the die body and the main surfaces. The apparatus also includes means for providing relative movement between the die and plate, such that the edge of the plate advances through the recess to receive the shaped polymer frame on the edge and at least one of the main surfaces of the plate.

In this embodiment, the portions of the sealing ledges that contact the plate include a layer of an elastic material, such as a thermoplastic, elastomeric, or thermoplastic coated elastomeric foam, thereon to facilitate the sliding movement. The elastic material has means for releasably securing the layer of elastic material to the sealing ledge to facilitate replacement of the layer. The releasable securing means preferably comprises a backing member for the elastic material. The backing member preferably includes a rib member for engaging a corresponding slot in the sealing ledge. Advantageously, the backing member is made of an engineering thermoplastic which has sufficient rigidity to retain the rib member in the slot, and the elastic material is secured to the backing member by a suitable adhesive. Furthermore, the extrusion die may include two channels for supplying polymer to the open area and means for independently regulating the flow of polymer in each channel to facilitate the extrusion of the polymer through the open area and onto the plate.

Yet another embodiment of the invention relates to a process for producing a shaped polymer frame on a plate having top and bottom main surfaces and a peripheral edge. The process comprises placing an extrusion die adjacent the plate edge, wherein the extrusion die has a body which defines a plate-receiving recess for receiving the edge of the plate and portions of the main surfaces adjacent thereto and a first sealing ledge which is movable between (1) a retracted position which allows entry of the plate edge into the recess, and (2) an engaged position in contact with one of the main surfaces of the plate. An open area is defined between the die body, sealing ledge and the plate in the shape of the polymer frame that receives the plate edge in the recess of the extrusion die. The process additionally moves the first sealing ledge into contact relation with at least one of the main surfaces of the plate, advances the plate edge through the recess and deposits polymer onto the plate edge and a portion of at least one of the adjacent main surfaces through the open area of the die during movement of the plate edge through the recess to provide the polymer frame thereon.

In this method, the polymer may be a moisture-hardening reaction polymer which is deposited upon the peripheral edge of the plate as it advances through the recess. The first sealing edge preferably moves in a direction which is essentially perpendicular to the main surfaces of the plate and is biased towards the engaged position and the method further comprises returning the first sealing ledge to the retracted position after deposition of the polymer frame. The extrusion die may also include a second sealing ledge which is movable between (1) a retracted position which allows entry of the plate edge into the recess, and (2) an engaged position in contact with the other main surface of the plate, and the method further comprises moving the second sealing ledge into contact relation with the other main surface of the plate before the plate edge is advanced through the recess. Each sealing ledge may be biased towards the engaged position and the method further comprises returning each sealing ledge to the retracted position after deposition of the polymer frame.

The moisture hardening reaction polymer preferably comprises a thermoplastic polyolefin elastomer constituted by isotactic polypropylene and ethylene propylene diene rubber. Also, the elastic material is preferably selected from the group consisting of thermoplastic foam, elastomeric foam, and thermoplastic coated elastomeric foam.

BRIEF DESCRIPTION OF THE DRAWINGS

Further features and advantages of the invention can be gathered from the claims and the following description with respect to the attached drawings, wherein:

DETAILED DESCRIPTION OF THE PREFERRED EMBODIMENTS

The invention has as its objective to produce an extrusion head that will make possible the extrusion of a polymer onto the periphery of a plate, such as an automobile pane, for the purpose of producing a profile which rests on the edge face of the pane and on at least one of its main faces. Independently of the variations in thickness of the pane, the extrusion head must allow a proper and geometrically accurate transition to be made between the profiled member and the face or faces of the pane.

The invention proposes a device for extruding a profiled cord of polymer onto the periphery of a plate, in particular an automobile pane. The device comprises an extrusion head in relative displacement along the periphery of the plate, against the edge face of which it bears upstream, at the same time as at least one half-jaw bears on a main face of the plate. The downstream wall aft of the extrusion head comprised of an extrusion nozzle, the orifice of which is bounded, amongst other things, by the surface of the plate itself and by its edge face, in which device a supporting and conveying system is provided for the plate and in which the half-jaw of the extrusion head in bearing against the main face of the plate comprises a shoe movable perpendicularly to this face of the plate which, during extrusion, is pressed onto the plate.

In a variation of the invention, the extrusion head comprises a jaw, one half-jaw of which is equipped with a movable shoe, while the other half-jaw has its surface in contact with the surface of the plate, this half-jaw surface extending in the continuity of the plate surface. It is also provided that the extrusion head comprises a jaw, the two half-jaws of which are equipped with shoes movable perpendicularly to the surfaces of the plate which, during extrusion, are pressed onto these surfaces, and preferably the surfaces of the extrusion head pressed onto the surfaces of the plate are equipped with a layer of an elastic member having good sliding properties on the surfaces of the movable plate.

The elastic member is preferably a foam that has sufficient compressibility to allow insertion and removal of the glass pane, as well as a relatively low friction surface to facilitate sliding movement over the glass. A preferred construction is a neoprene foam that includes a teflon coating on the external surface that contacts the glass. The low friction coating is not critical, as certain high performance foams provide sufficient surface properties to facilitate the sliding movement of the glass. Thus, other materials that can be processed into a foam can be used, such as polyurethanes, thermoplastics, such as polyvinyl chloride, or elastomers, such as rubber. When desired, other fluoropolymers or nylon can be used as the low friction coating. The coating can be applied to the foam in any one of a number of conventional manners which need not be described in any further detail herein.

Figure 1:
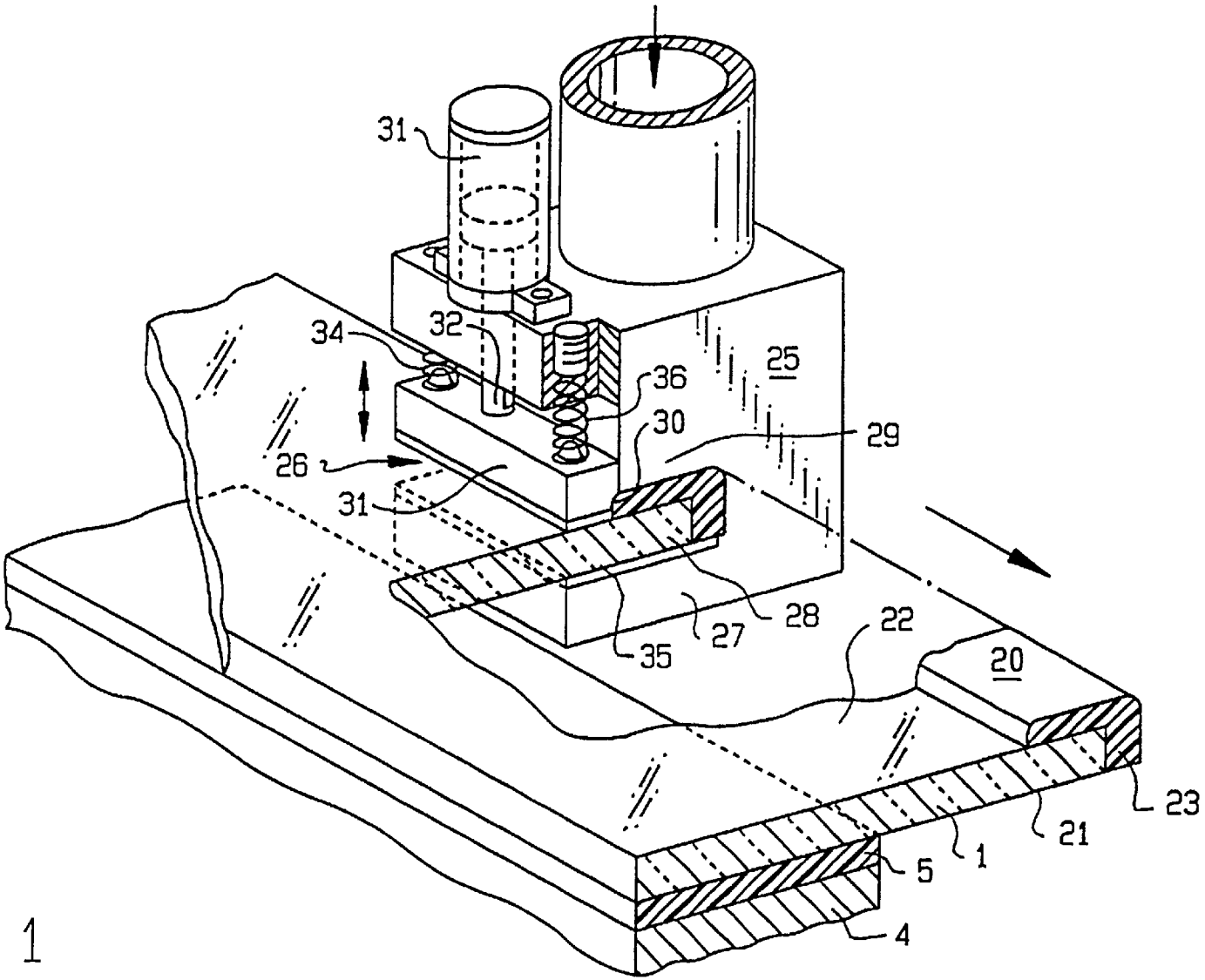
FIG. 1 illustrates a form of the embodiment of an extrusion head for extrusion of a polymer frame of L-section.
Figure 2:
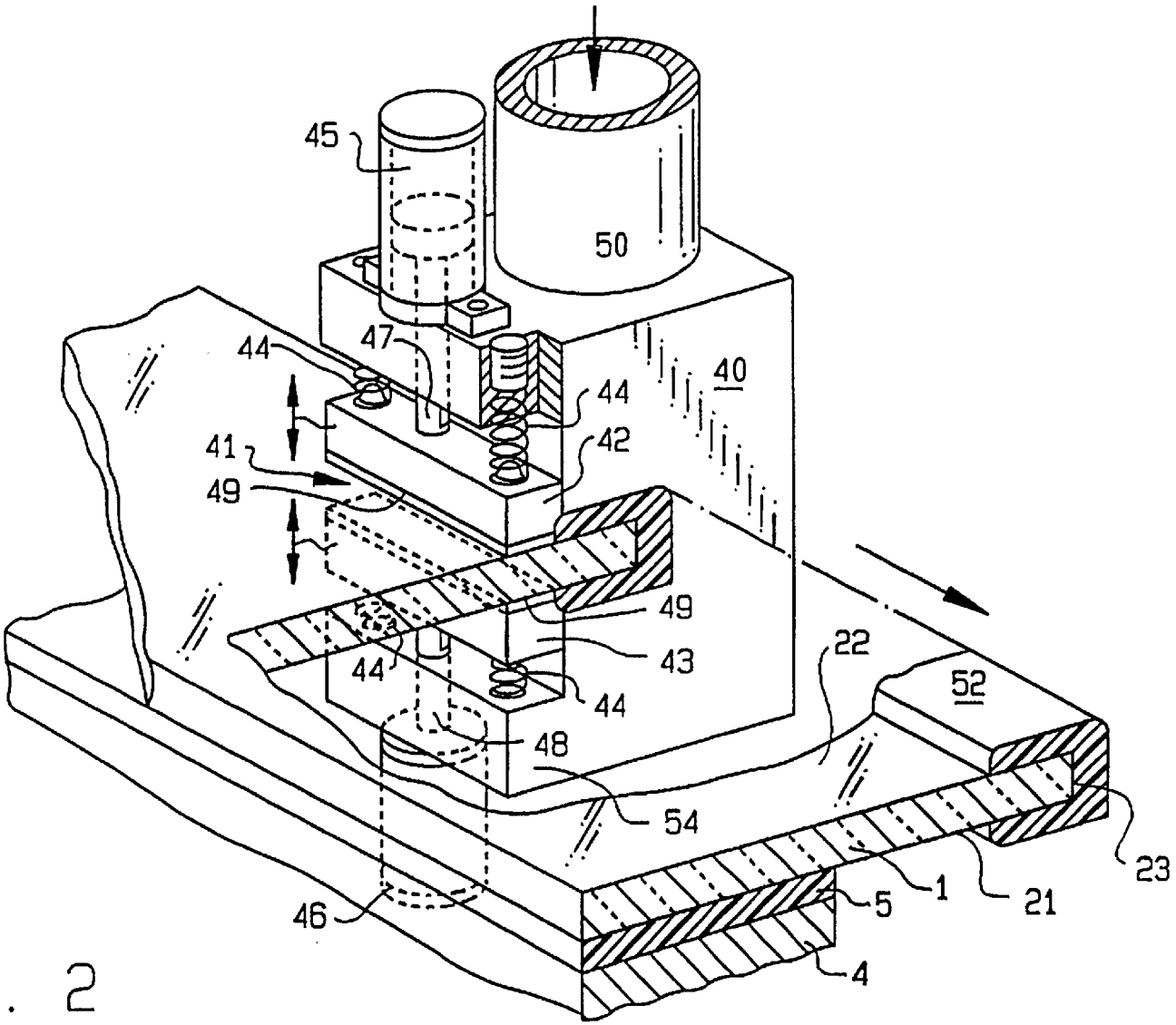
FIG. 2 shows a form of embodiment of an extrusion head for placing by the extrusion of a frame of U-section straddling the edge of the pane.
Figure 3:
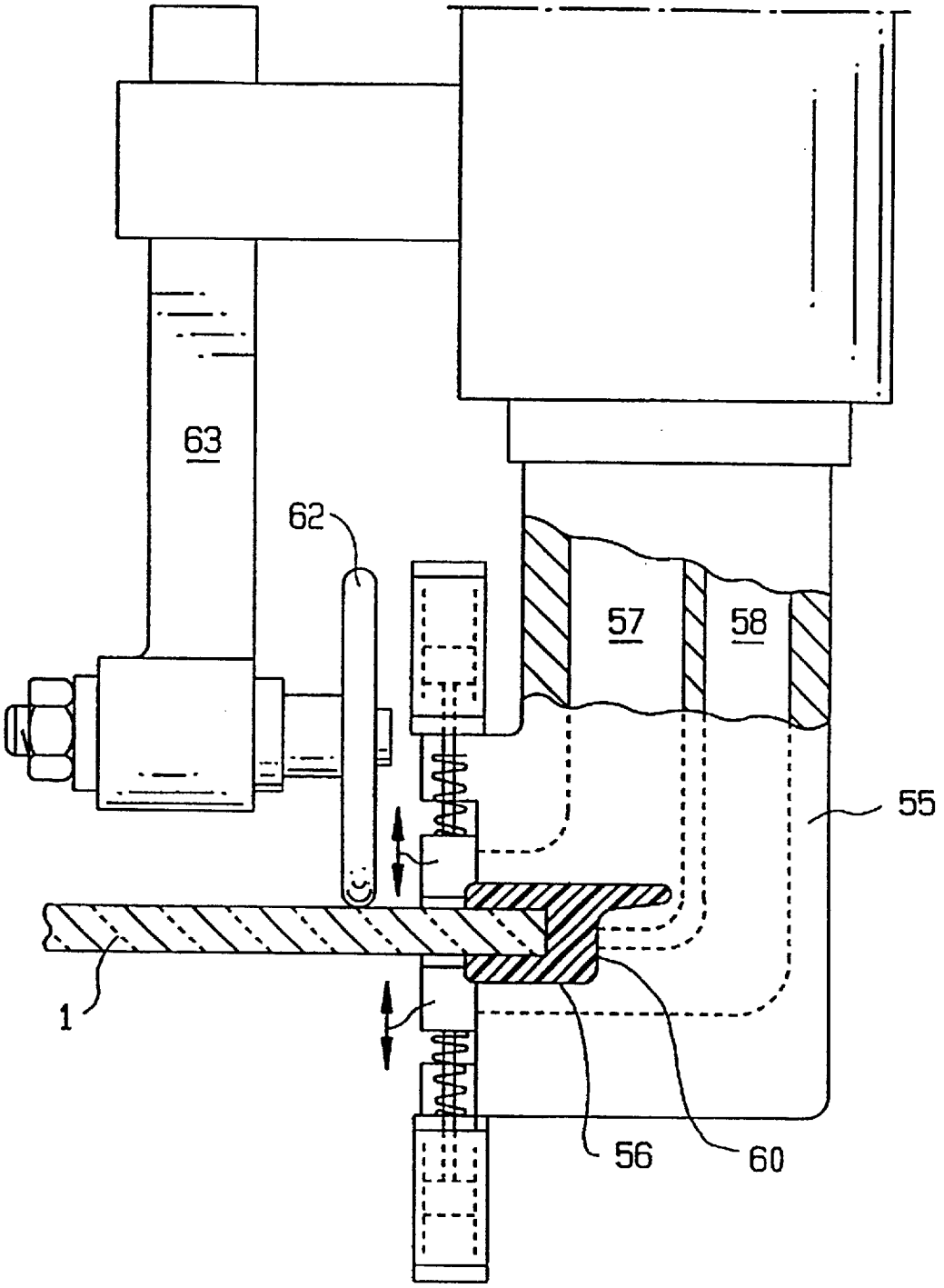
FIG. 3 shows a detail of an extrusion head in accordance with this invention.

In the embodiment of FIGS. 1–3, the sealing ledges will form a seal on the pane whether the pane is movable or fixed in relation to the extrusion die. The provision of movable sliding lateral shoes or sealing ledges, allows the formation of a relatively tight seal on the pane during extrusion of the polymer, but also the easy insertion or removal of the pane before and after the time that the polymer is extruded. The sealing ledges are pressed onto the surfaces of the glass during the relative displacement of the extrusion head and the pane by means of springs, but which, at the instant at which the pane is placed in position or to be removed, are moved away by jacks so as to permit the free movement of the pane through the jaw which constitutes the extrusion head. In fact, it is possible to adjust the position of the extrusion head relative to the edge of the plate such that one side of the jaw shall always be in contact with the corresponding surface of the pane, while the other comprises the sliding shoe. The purpose of the sliding shoe is to follow the surface during the relative longitudinal displacement of the extrusion head and pane during the extrusion and to release passage at the start and the end of the operation when the relative displacement takes place perpendicularly to the edge of the pane.

A head of the foregoing type is advisable, principally, in those cases in which the cord to be extruded has an L-profile which is, at one of the ends of its cross-section, in continuity with the surface of the pane. Such cords are desired, for example, when automobile panes must be mounted flush with the bodywork for aerodynamic reasons. In this case, the extrusion head should be constructed so that the upstream wall face of its head shall be in contact with the surface of the pane as far as its edge face and shall radially continue, in an outward direction, to the main surface of the pane. It is also possible to construct the extrusion head so as to obtain a frame which encompasses or grips the edge of the pane on its three faces. The extruded frame may then, in principle, have any cross-section.

The description that follows concerns the invention in the case where frames are placed by extrusion on panes, in particular automobile panes. The extrusion head of this invention, however, enables other objects of plate-shape or comprising a plate, such as doors or construction elements, to be equipped with frames or appropriate seals.

An extrusion head according to this invention in particular advantageously enables thermoplastic polymers to be extruded onto the edge of various plates, in particular panes. As thermoplastic polymer may be used, for example, thermoplastic polyolefin elastomers of isotactic polypropylene and ethylenepropylene-diene rubber. In the use of thermoplastic polymers, it is indicated to heat the panes. For example, at a temperature of approximately 150° C., the thermoplastic polymer is melted in an extruder and is fed to the extrusion head either directly, if the head is fixed, or by means of a pressure-resistant, heating flexible tube if it is movable. However, instead of thermoplastic polymers, it is possible to use reactive substances, for example, reactive components for humidity-hardening polyurethanes. In this case, the extruder is replaced by a suitable pump, which supplies the material to be extruded to the extrusion head.

When the extrusion head and the pane, after the extrusion has been deposited around the entire pane, have returned to their starting positions, the volume flow of the polymer is interrupted, the pane is moved away from the extrusion head and the pane, provided with the frame, is brought to the next working station, while at the same time another pane is brought into the extrusion station. The extrusion cycle then recommences.

The transition point between the start and the end of the extruded polymer cord inevitably has deformations, because of the radial displacement of the pane at the end of the extrusion operation. This transition point must therefore be retouched during the operation which follows. The retouching of the transition point may be carried out, for example, in accordance with one of the processes forming the subject of documents EP 0 421 833 or EP 0 524 060. The retouching of the transition zone is particularly simple if a thermoplastic polymer is extruded, because in this case all that is necessary is to perform a finishing pressing using a heated pressing tool.

FIG. 1 shows the basic structure of an extrusion head used when a pane 1 is to be provided with a polymer frame 20 which, on one side of the pane that is the side of the main surface 21, continues this surface 21 by its own surface, at the same level, but for the remainder has an L-shaped section, the flanges of the profile being in contact, respectively, with the main surface 22 and with the peripheral edge face 23 of the pane and being firmly fixed to the surface of the glass. The methods of functioning of the extrusion head of FIG. 1 are various. They belong to two principal groups, in which either the pane is fixed and the extrusion head, moved manually or under control of a robot, travels along the periphery of the pane or, conversely, the pane is moved past the extrusion head, which is slightly or not at all movable.

In this latter case, which is of particular interest in this invention, and, when the glass is curved, several cases can arise:

- the extrusion head is fixed and it is the pane that is moved by a robot so that the edge at which the extrusion is to be performed is at the correct place and in the correct direction, that is with the convex face of the curvature tangential to one wall face of the jaw of the extrusion head;
- the pane is travelling in translation without changing its orientation relative to this plane. Its edge travels along the perpendicular to the extrusion head and the head, movable vertically, can pivot so that its jaw remains tangential to the edge of the pane; intermediate situations are also possible, with the pane, the edge of which is in rectilinear lateral displacements in front of the head, which pivots to have the correct orientation.

The extrusion head 25 has a jaw 26 with a U-section, which extends in the direction of the displacement, into which jaw engages the edge of the pane 1. This jaw 26, of U-shape, is bounded on the lower side by the half-jaw 27, the upper surface 28 of which, during the extrusion operation, is in contact with the main surface 21 of the pane 1. On the upper side, the jaw 26 of the extrusion head is formed by the half-jaw 29.

In the downstream wall face of the extrusion head is the calibrated orifice of the nozzle, which determines the cross-section of the extruded polymer cord. The aperture of the U of the extrusion head is bounded by the wall face 30 of the movable shoe 31. This shoe 31 is mounted so that it is movable in the vertical direction. It can be raised by means of the rod 32, by use of the pneumatic or hydraulic jack 33. In the lowered position, the shoe 31 is pressed against the surface 22 of the pane 1 by helical springs 34 or other means producing the same effect. The bearing force exerted by the springs 34 must be adjusted in such a way that a good seal shall be assured of the surfaces of the extrusion head 25 that slide on the two main faces of the pane 1. On the other hand, the bearing pressure must not be too great so that the friction forces do not become too high during the extrusion operation, which could, on the one hand, interfere with the relative movement of the head and pane and, on the other hand, wear the sliding surfaces of this head.

The jack 33, which actuates the sealing shoe 31, is governed by a central control unit. The sealing shoe 31 is brought into its upper, end position by means of the jack 33 when the extrusion head-pane assembly 25 is displaced from its at-rest position to its working position and when both, at the end of the extrusion operation, are brought back into their at-rest position, separated from each other.

On each of the sliding surfaces of the extrusion head 25, that is the surface 28 of the half-jaw 27 and the lower face of the shoe 31, there is disposed a lining 35 and 36, made of an elastic material having good sliding properties with respect to glass. These linings 35 and 36 serve for improving the seal of the extrusion chamber at the position of the surfaces of the pane, for accepting variations in curvature of the plate and for facilitating sliding. As noted above, a teflon coated neoprene foam is advantageous for use as these linings. Furthermore, these linings 35 and 36 are advantageously mounted so that they can be rapidly replaced when necessary. These linings may, for example, be removably mounted parallel to the edge of the pane, such that the movement of the plate relative to the die would not move the mounted lining. Additionally, these linings may be mounted to the extrusion die by means of fasteners that are recessed from the surface of the lining so as not to make contact with the pane.

The extrusion head 40 shown in FIG. 2 is basically made in analogous manner to the head 25 described in relation to FIG. 1, but it is distinguished by the fact that the two half-jaws 50 and 51, which bound the U-section jaw 41, comprise movable sealing shoes 42 and 43. The sealing shoes or ledges 42 and 43 are in the present case also pressed against the two principal surfaces of the pane 1 by helical springs 44. The pneumatic or hydraulic jacks 45 and 46 bring the sealing shoes, by means of rods 47 and 48, into their final opened position, when the extrusion head is brought from its waiting position relative to its working position on the edge of the pane and when, at the end of the extrusion operation, the head 25 and the pane 1 move apart from one another. Replaceable linings 49, made of an elastic material having good sliding properties with respect to glass, are also mounted on the sliding surfaces of the two sealing shoes 42 and 43.

The extrusion head 40 is suitable for the extrusion of a profiled cord 52 which fits around the peripheral part of a pane, on its edge face and its two main faces, with a U-section. FIG. 3 shows an extrusion head 55 constructed on the principle described above, in its working position in which the calibrated orifice of the nozzle 56 of the extrusion head is supplied, with polymer to be extruded, through two separate ducts 57 and 58. The polymer flow rate in each of these ducts can be regulated separately by appropriate throttling devices installed in these ducts or in pipes that supply them with polymer. It thus becomes possible to supply, at different parts of the cross-section of the orifice 56 of the extrusion head, different volumetric flow rates if, as in the case illustrated, the cross-section of the profile 60 of the frame is not symmetrical and, consequently, a larger quantity of material is necessary in one part of the orifice of the die than in another part. Another, case in which it is advantageous to meter material intended for the inner part and the outer part of the profile at different flow rates is the production of curves of the extruded profile in the corners of the plate, and especially of the pane.

In FIG. 3, there is also shown a bearing wheel 62, which is mounted on the extrusion head carrying the nozzle 55, by means of a support 63. This bearing wheel 62 serves for compensating the tolerances of shape of the pane 1 in the direction perpendicular to the surface of the pane, in particular in the case of curved panes. For this purpose, the extrusion head is mounted so that it can move a few millimeters in the vertical direction, in such a way that the compensation necessary for the tolerances is performed by means of the bearing wheel 62.

Figure 4:
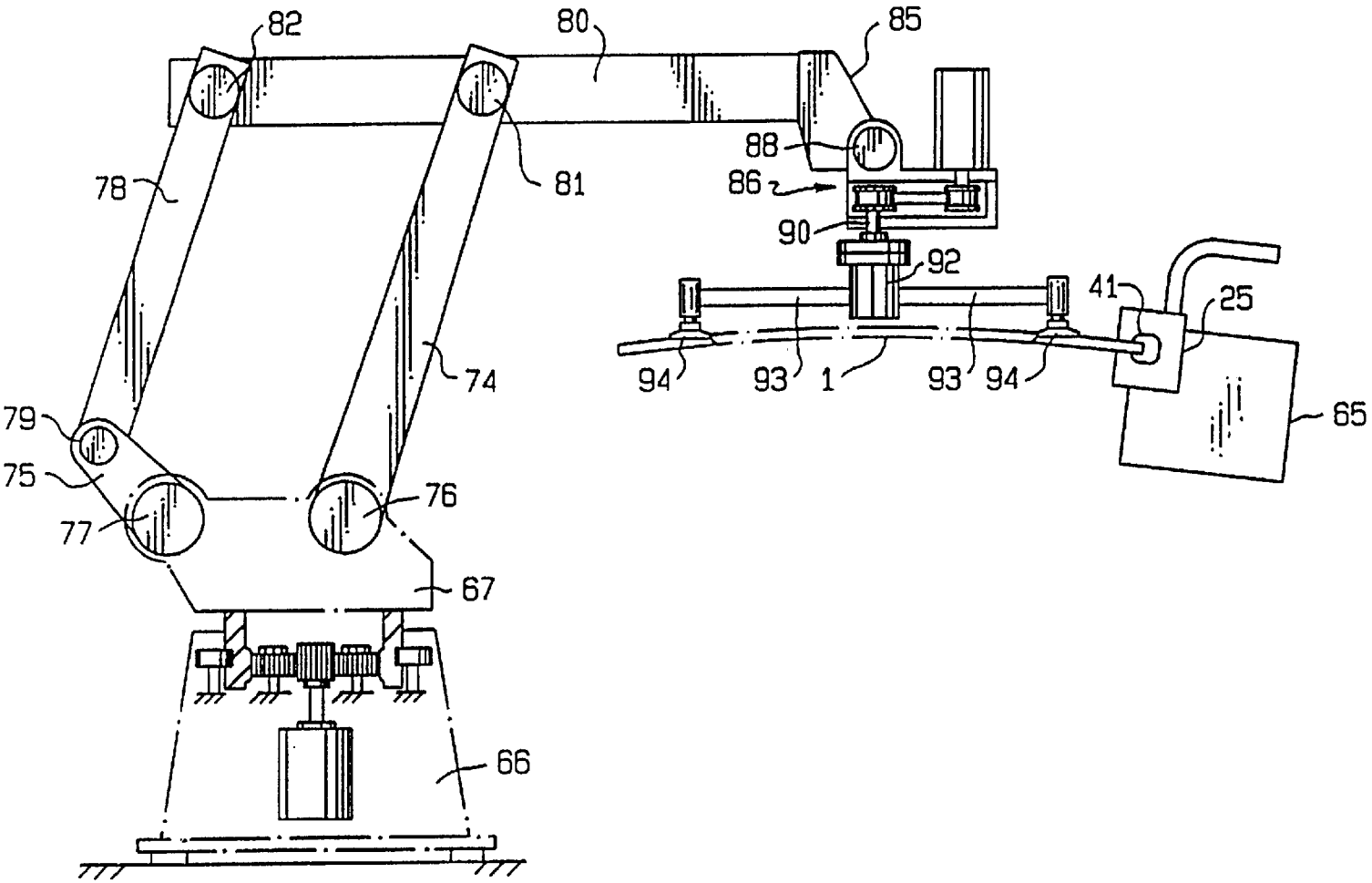
FIG. 4 is an illustration of a robot which can be used for moving the edge of the glass pane past the extrusion head.

FIG. 4 illustrates a robot that can be used for moving the edge of the glass pane past the extrusion head. In FIG. 4 there is shown a robot with a supporting member 66 fixed to the floor containing conventional means for moving the robot's swivel member 67, rotating forwardly and reversedly shafts 76, 77, 79, 81, 82, 88, and 90, and arms 74, 75, 78, 80, and 93. A panel suction unit 86 is attached to the arm 80 by means of a mounting member 85, and is used to provide suction through the four orthogonal arms 93 to the four suction cups 94 used to support the pane 1. Supporting arm 92 rotates the plate by means of shaft 90 through the mouth 41 of the relatively fixed extrusion head 25, which is itself attached to a support 65. As such robots are generally know, no further description needs to be included here. Despite that such robots are known, it is the novel extrusion heads of the present invention which enable the deposition of uniform, acceptable profile frames upon the glass surfaces of the panes.

It is also optionally possible, however, to use an extrusion die with rigidly positioned sealing ledges. This presupposes that the glass plates to be provided with the polymer frame have very small thickness tolerances and that the internal dimensions of the die mouth are very accurately matched to the thickness dimensions of the glass plates. The gap between a sealing face of the extrusion die and the glass surface can vary between approximately 0.1 and 0.5 mm depending upon the viscosity and related characteristics of the polymer which is used. In this mode, the foam of the elastic material compresses as the plate enters the jaw of the extrusion die to form the seal. For example, the foam may be angled to create a wedge-shaped recess into which the pane may enter from the wider end of the wedge. Upon entry of the pane fully into the recess, the pane will compress the foam and create a seal.

In the case of extrusion dies that have a rigid die mouth, the extruded polymer strand can be removed by movement of the die when the die is removed from the glass plate at the end of the extrusion operation. However, the frame profile can be reshaped at this point in a problem-free manner according to known methods.

Figure 5:
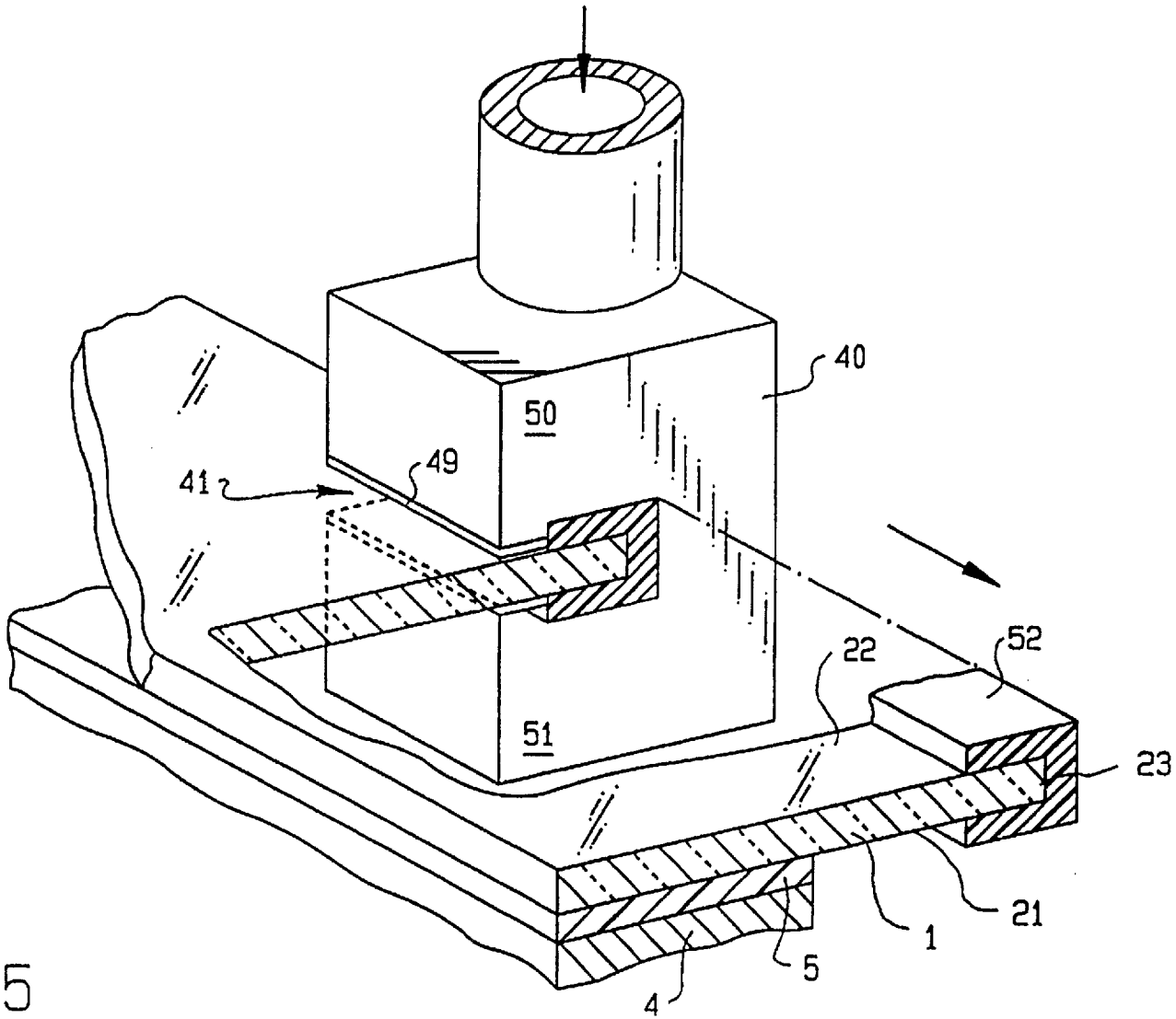
FIG. 5 illustrates another form of the embodiment of an extrusion head having fixed mouth jaws.

FIG. 5 illustrates another form of the embodiment of an extrusion head 40 having two fixed mouth jaws each having an elastic layer 49. The pane 1 slides along the mouth 41 of the extrusion die 40. The upper surface 22 and lower surface 21 of the pane 1 slide through the fixed mouth jaws with an elastic layer 49, receiving a polymer frame 52 upon the pane's edge 23 and at least one main surface. As noted above, a wedge shape can be provided on each sealing ledge to facilitate insertion of the plate into the recess.

Figure 6:
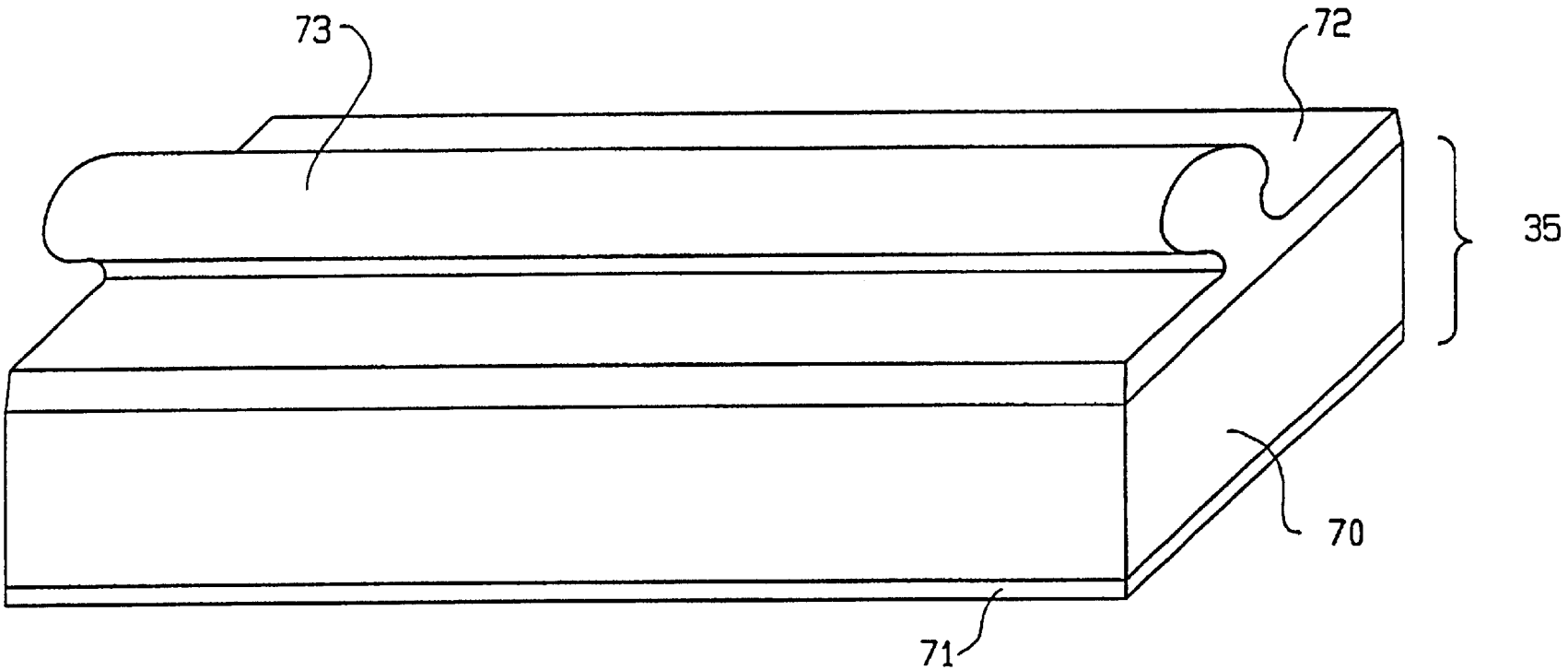
FIG. 6 illustrates a preferred configuration for the elastic member and its attachment to the sealing ledges.

FIG. 6 illustrates a preferred arrangement for fastening the elastic material to the sealing ledge. Lining 35 includes elastic material 70 and low friction coating 71. The elastic material is attached to a backing member 72 by a suitable adhesive for the materials used. The backing member is preferably made of an engineering thermoplastic, such as nylon, polycarbonate, or the like, so that it can provide sufficient strength to join the lining to the sealing ledge.

In a most preferred embodiment, the backing member 72 includes a rib member for engaging a corresponding slot in the sealing ledge. This allows the arrangement to be easily installed or replaced when the low friction coating or elastic material becomes worn or damaged. In addition, the backing member can be re-used, and a new lining placed thereon for future use. This arrangement can be used on either the fixed jaw or movable jaw embodiments, on one or preferably both of the sealing ledges.

Although the preceding embodiments represent preferred aspects of the invention, the true scope is not to be limited except as recited literally in the following claims and including all modifications which are equivalent or obvious to one of ordinary skill in the art.

What is claimed is:

1. An apparatus for producing a shaped polymer frame on a plate having top and bottom main surfaces and a peripheral edge, which comprises:

an extrusion die having a body which defines a plate-receiving recess for receiving the edge of the plate and portions of the main surfaces adjacent thereto;

a first sealing ledge which is movable between (1) a retracted position which allows entry of the plate edge into the recess, and (2) an engaged position in contact with one of the main surfaces of the plate which defines an open area between the die body, sealing ledge and the plate in the shape of a polymer frame; and means for moving the plate relative to the extrusion die, where the moving means advances the edge of the plate through the recess to receive the shaped polymer frame on the edge and one of the main surfaces of the plate.

2. The apparatus of claim 1 which further comprises means for moving the first sealing ledge between the retracted and engaged positions in a direction which is essentially perpendicular to the main surfaces of the plate.

3. The apparatus of claim 2 wherein the moving means comprises spring means for biasing the first sealing ledge toward the engaged position and rod means for returning the first sealing ledge to the retracted position.

4. The apparatus of claim 1 wherein the recess includes a first surface which is spaced from the plate and a second surface which contacts the plate on the surface opposite that which is contacted by the first sealing ledge in the engaged position, so that the polymer frame is provided on the edge and a portion of one main surface of the plate.

5. The apparatus of claim 4 wherein the portions of the first sealing ledge and recess which contact the plate include a layer of an elastic material thereon to facilitate sliding movement upon the plate.

6. The apparatus of claim 1 which further comprises a second sealing ledge which is movable between (1) a retracted position which allows entry of the plate edge into the recess, and (2) an engaged position in contact with the other main surface of the plate.

7. The apparatus of claim 6 wherein one or both of the sealing ledges includes an arcuate surface which assists in the formation of an arcuate portion for the polymer frame.

8. The apparatus of claim 6 wherein the recess includes first and second surfaces which are spaced from the plate, so that the polymer frame is provided on the edge and a portion of each main surface of the plate.

9. The apparatus of claim 1 which further comprises a support wheel which travels along the surface of the plate and compensates for shape tolerances of the plate.

10. An apparatus for producing a shaped polymer frame on a plate having top and bottom main surfaces and a peripheral edge, which comprises:

an extrusion die having a one-piece body which defines a plate receiving recess for receiving the edge of the plate and portions of the main surfaces adjacent thereto;

said plate receiving recess comprising first and second sealing ledges which are movable between (1) a retracted position which allows entry of the plate edge into the recess, and (2) an engaged position in contact with the main surfaces of the plate which defines an open area between the die body, sealing ledges and the plate in the shape of a polymer frame, wherein the sealing ledges, in the engaged position, provide a seal for said recess and facilitate sliding movement between said die body and said main surfaces; and means for providing relative movement between the die and plate such that the edge of the plate advances through the recess to receive the shaped polymer frame on the edge and at least one of the main surfaces of the plate.

11. The apparatus of claim 10 wherein the portions of the sealing ledges that contact the plate include a layer of an elastic material thereon to facilitate said sliding movement.

12. The apparatus of claim 11 which further comprises selecting the elastic material from the group consisting of thermoplastic foam, elastomeric foam, and thermoplastic coated elastomeric foam.

13. The apparatus of claim 12 which further comprises means for releasably securing the layer of elastic material to the sealing ledge to facilitate replacement of said layer.

14. The apparatus of claim 13 wherein the releasable securing means comprises a backing member for the elastic material, with the backing member including a rib member for engaging a corresponding slot in the sealing ledge.

15. The apparatus of claim 14 wherein the backing member is made of an engineering thermoplastic having sufficient rigidity to retain the rib member in the slot.

16. The apparatus of claim 15 wherein the elastic member is secured to the backing member by an adhesive.

17. The apparatus of claim 10 wherein the recess includes a first surface which is spaced from the plate and a second surface which contacts the plate on the surface opposite that which is contacted by the first sealing ledge, so that the polymer frame is provided on the edge and a portion of one main surface of the plate.

18. The apparatus of claim 10 wherein the recess includes first and second surfaces which are spaced from the plate, so that the polymer frame is provided on the edge and a portion of each main surface of the plate.

19. The apparatus of claim 10 wherein one or both of the sealing ledges includes an arcuate surface which assists in the formation of an arcuate portion for the polymer frame.

20. The apparatus of claim 10 wherein the extrusion die includes two channels for supplying polymer to the open area and means for independently regulating the flow of polymer in each channel.

21. The apparatus of claim 10 which further comprises means for extruding the polymer through the open area and onto the plate.

22. A process for producing a shaped polymer frame on a plate having top and bottom main surfaces and a peripheral edge, which process comprises:

placing an extrusion die adjacent the plate edge, wherein the extrusion die has a body which defines a plate-receiving recess for receiving the edge of the plate and portions of the main surfaces adjacent thereto; and a first sealing ledge which is movable between (1) a retracted position which allows entry of the plate edge into the recess, and (2) an engaged position in contact with one of the main surfaces of the plate which defines an open area between the die body, sealing ledge and the plate in the shape of a polymer frame;

receiving the plate edge in the recess of the extrusion die;

moving the first sealing ledge into contact relation with at least one of the main surfaces of the plate;

advancing the plate edge through the recess; and depositing polymer onto the plate edge and a portion of at least one of the adjacent main surfaces through the open area of the die during movement of the plate edge through the recess to provide the polymer frame thereon.

23. The method of claim 22 wherein the polymer is a moisture-hardening reaction polymer which is deposited upon the peripheral edge of the plate as it advances through the recess.

24. The method of claim 22 wherein the first sealing edge moves in a direction which is essentially perpendicular to the main surfaces of the plate and is biased towards the engaged position and the method further comprises returning the first sealing ledge to the retracted position after deposition of the polymer frame.

25. The method of claim 22 wherein the extrusion die further comprises a second sealing ledge which is movable between (1) a retracted position which allows entry of the plate edge into the recess, and (2) an engaged position in contact with the other main surface of the plate, and the method further comprises moving the second sealing ledge into contact relation with the other main surface of the plate before the plate edge is advanced through the recess.

26. The method of claim 25 wherein each sealing ledge is biased towards the engaged position and the method further comprises returning each sealing ledge to the retracted position after deposition of the polymer frame.

27. The method of claim 22 wherein the extrusion die includes two channels for supplying polymer to the open area and the method further comprises independently regulating the flow of polymer in each channel to facilitate the filling of the open area of the extrusion die.

28. The method of claim 22 wherein the recess includes a first surface which is spaced from the plate and a second surface which contacts the plate on the surface opposite that which is contacted by the first sealing ledge in the engaged position, and the method further comprises providing the first sealing ledge and the second surface of the recess with a layer of an elastic material thereon to facilitate sliding movement of the plate through the recess.

29. The method of claim 25 wherein the recess includes first and second surfaces which are spaced from the plate so that the polymer frame is provided on the edge and a portion of each main surface of the plate, and the method further comprises providing each sealing ledge with a layer of an elastic material thereon to facilitate sliding movement of the plate through the recess.

30. The method of claim 25 which further comprises forming an arcuate portion on the polymer frame by providing one or both of the sealing ledges with an arcuate surface which assists in the formation of the polymer frame.

31. The method of claim 22 which further comprises compensating for shape tolerances of the plate as the die travels along the plate.

32. The method of claim 23 wherein the moisture hardening reaction polymer comprises a thermoplastic polyolefin elastomer constituted by isotactic polypropylene and ethylene propylene diene rubber.

33. The method of claim 28 which further comprises selecting the elastic material from the group consisting of thermoplastic foam, elastomeric foam, and thermoplastic coated elastomeric foam.

34. The method of claim 29 which further comprises selecting each elastic material from the group consisting of thermoplastic foam, elastomeric foam, and thermoplastic coated elastomeric foam.

* * * * *

UNITED STATES PATENT AND TRADEMARK OFFICE

CERTIFICATE OF CORRECTION

PATENT NO. : RE37,341 P2
DATED : August 28, 2001
INVENTOR(S) : Gerd Cornils, Herbert Joeris, Rolf Kotte, and Heinz Scholl It is certified that error appears in the above-identified patent and that said Letters Patent is hereby corrected as shown below:

Title page,
Item [63], Related U.S. Applications Data, replace the phrase "Continuation-in-part of application No. 08/286,725, filed on August 5, 1995, now Pat. No. 5,507,994." with -- Continuation-in-part of application No. 08/286,725, filed on August 5, 1994, now Pat. No. 5,507,994. --

Signed and Sealed this

Twenty-sixth Day of February, 2002

*Attest:*

*Attesting Officer*

JAMES E. ROGAN
*Director of the United States Patent and Trademark Office*